(12) United States Patent
Chen et al.

(10) Patent No.: US 7,378,226 B2
(45) Date of Patent: May 27, 2008

(54) OZONE-ASSISTED BI-LAYER LIFT-OFF STENCIL FOR NARROW TRACK CPP-GMR HEADS

(75) Inventors: Chao-Peng Chen, Fremont, CA (US); Rina Kaji, Tokyo (JP); Jei-Wei Chang, Cupertino, CA (US)

(73) Assignees: Headway Technologies, Inc., Milpitas, CA (US); TDK Corporation, Tokyo (JP)

( * ) Notice: Subject to any disclaimer, the term of this patent is extended or adjusted under 35 U.S.C. 154(b) by 553 days.

(21) Appl. No.: 10/827,949

(22) Filed: Apr. 20, 2004

(65) Prior Publication Data
US 2005/0233258 A1    Oct. 20, 2005

(51) Int. Cl.
*G03F 7/00*    (2006.01)
(52) U.S. Cl. .................. 430/311; 430/312; 430/313
(58) Field of Classification Search .............. 430/313, 430/311, 312
See application file for complete search history.

(56) References Cited

U.S. PATENT DOCUMENTS

| | | | |
|---|---|---|---|
| 6,493,926 B2 * | 12/2002 | Han et al. ................. | 29/603.14 |
| 6,635,185 B2 * | 10/2003 | Demmin et al. ............... | 216/64 |
| 2002/0167764 A1 | 11/2002 | Fontana, Jr. et al. ........ | 360/313 |
| 2003/0170961 A1 | 9/2003 | Morgan et al. ............. | 438/396 |
| 2004/0103524 A1 * | 6/2004 | Breyta et al. ............ | 29/603.03 |
| 2004/0109263 A1 * | 6/2004 | Suda et al. ................. | 360/322 |
| 2006/0024618 A1 * | 2/2006 | Chen et al. ................. | 430/312 |

* cited by examiner

Primary Examiner—Mark F. Huff
Assistant Examiner—Caleen O. Sullivan
(74) Attorney, Agent, or Firm—Saile Ackerman LLC; Stephen B. Ackerman

(57) ABSTRACT

A method for forming a big-layer lift-off mask for use in fabricating GMR read-head sensors with trackwidths of less than 0.1 microns. The mask layers are formed symmetrically on each other, each layer of the mask having a novel dog-bone shape and the lower mask layer being substantially undercut relative to the upper mask layer. The central portion of the lower mask layer forms a narrow ridge that maintains the upper mask layer at a fixed height above a substrate, thereby avoiding problems associated with big-layer lift-off masks of the prior art. The method of forming the lower ridge requires a carefully controlled undercutting of the lower mask layer, which is accomplished by using an ozone-assisted oxidation process.

13 Claims, 4 Drawing Sheets

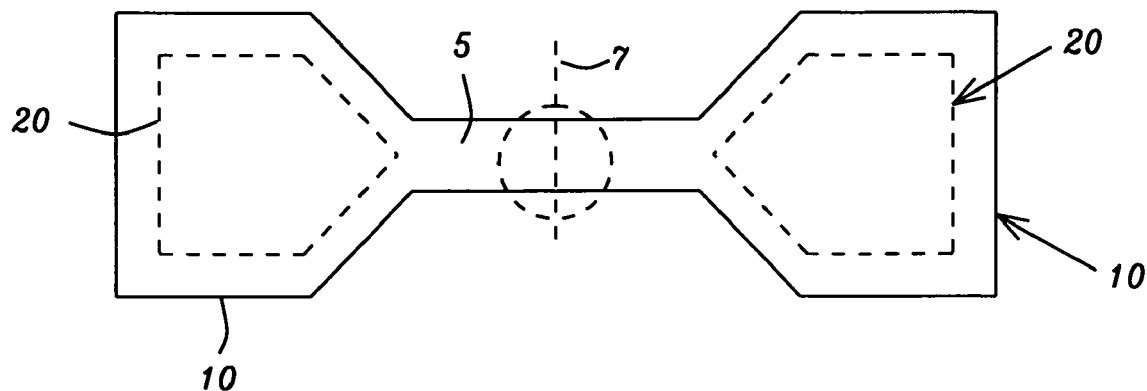
FIG. 1a – Prior Art
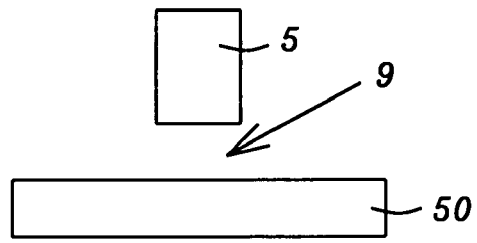
FIG. 1b – Prior Art
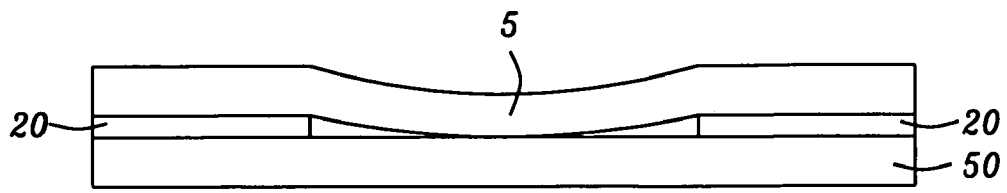
FIG. 2a – Prior Art

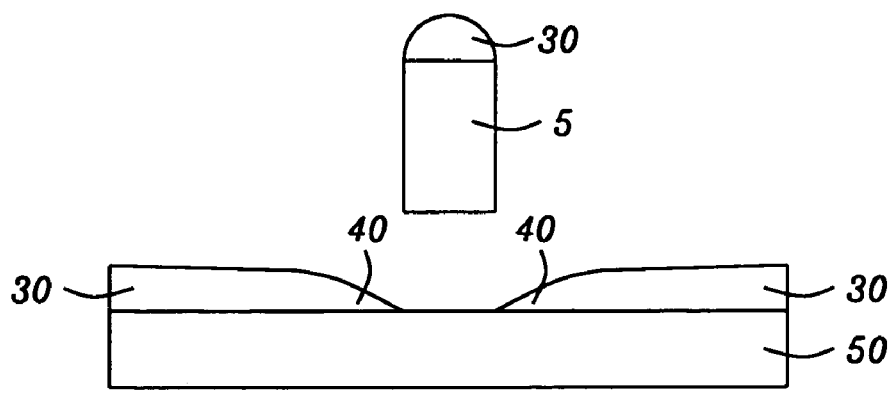
FIG. 2b – Prior Art
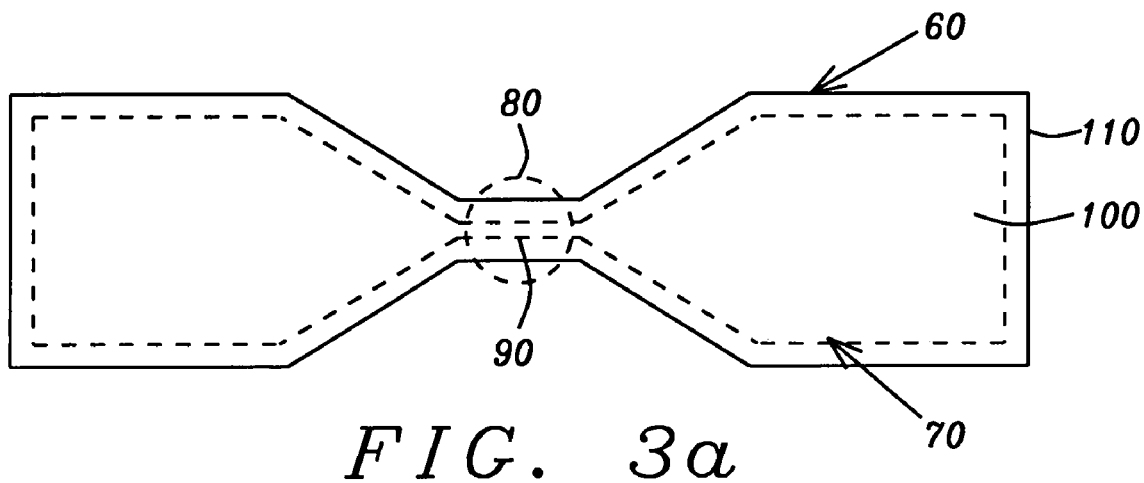
FIG. 3a
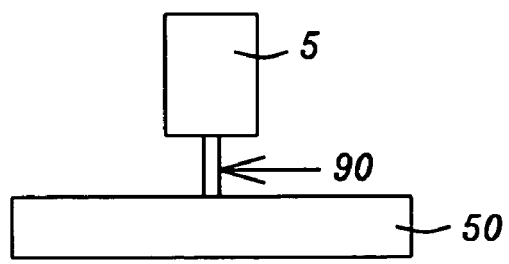
FIG. 3b

OZONE-ASSISTED BI-LAYER LIFT-OFF STENCIL FOR NARROW TRACK CPP-GMR HEADS

BACKGROUND OF THE INVENTION

1. Field of the Invention

This invention relates generally to the fabrication of a giant magnetoresistive (GMR) magnetic field sensor in the current-perpendicular-to-plane (CPP) configuration, more specifically to the use of a novel big-layer lift-off mask to pattern such a sensor having an ultra-narrow track width.

2. Description of the Related Art

Magnetic read sensors that utilize the giant magnetoresistive (GMR) effect for their operation must be patterned to produce a required trackwidth. Such patterning is conventionally done using a single photolithographic lift-off mask as both an etching stencil and a deposition mask. The shape of the stencil portion of such a mask permits the necessary trimming of the deposited layers to the required trackwidth and then the mask is used to allow deposition of additional layers (eg. conduction lead layers, biasing layers and/or insulation layers) within the removed regions. If the trackwidth of the read element is to be held below about 0.1 microns, then the prior art methods of forming the prior art masks have notable shortcomings. Han et al. (U.S. patent application Ser. No. 6,493,926), assigned to the same assignee as the present invention and which is fully incorporated herein by reference, discusses several problems associated with prior art lift-off masks in which an upper (stencil) layer of photoresist is formed over a lower, undercut, pedestal, layer. In such mask designs the width of the pedestal layer becomes a critical factor in the proper performance of the mask during the deposition stage. If the pedestal is undercut too much, the upper portion of the mask can collapse prematurely under the weight of deposition residue making a clean lift-off of the mask impossible. On the other hand, if the pedestal is insufficiently undercut, subsequent depositions can build up against the pedestal, called "fencing," leading to excessive thicknesses of the deposited material and short-circuiting of conductive layers. To overcome the difficulties of forming properly and consistently undercut pedestals and for use in forming trackwidths of approximately 0.5 microns, Han et al. teach the formation of a big-layer suspension-bridge mask formation, in which there is no pedestal directly beneath the upper portion of the mask, but wherein the upper portion is supported on two pedestals that are laterally disposed beneath two distal ends of the mask. The complete elimination of any support directly beneath the mask thereby avoids the problems associated with insufficient or overly-sufficient pedestal undercut. The formation taught by Han et al. requires that the portion of the mask that would ordinarily be beneath the upper portion be completely removed, so that the upper portion is suspended above the device to be patterned and does not contact it. This object is achieved by forming the pedestal portion of the mask of a layer of PMGI, while forming the upper portion of the mask of a layer of photoresist material. Application of a proper developing solution thereupon dissolves the lower PMGI portion preferentially relative to the photoresist upper portion, removing the PMGI except beneath the end portions where it remains to serve as a support.

Fontana J R., et al. (US Patent Application Publication No. US 2002/0167764 A1) also teach the formation of a suspension bridge type big-layer lift-off mask in which a layer of PMGI (polydimethylglutarimide) polymer is first spun onto a substrate and then a layer of PMMA is spun over the PMGI layer. An e-beam is then used to form a mask pattern in the upper layer by developing the upper layer and the PMGI layer is dissolved to form the undercut region.

The method taught by Han et al. was applied to patterning trackwidths on the order of 0.5 microns. Attempts to apply the method of Han et al. to produce trackwidths below 0.1 microns discloses insufficiencies in that mask design. In particular, the suspended photoresist portion of the mask must be narrowed to such a degree relative to its length that it sags and contacts the substrate directly beneath it. An additional problem occurs when the void portion beneath the suspended portion is so large that subsequent depositions cover portions of the substrate beneath the bridge ("overspray"), leading to inconsistent definition of the trackwidth.

Referring to FIG. 1a there is shown, schematically, an overhead view of a suspension-bridge mask of the type taught by Han et al., formed in a "dog-bone" shape, wherein a narrow central portion (5) of the upper photoresist portion of the mask are supported by its distal ends (10), which are flared outward and rest on lower, undercut pedestal regions (20), which cannot be seen from above and are shown in broken line outline. FIG. 1b shows a cross-sectional transverse view of the same mask (taken through the center line (7) of FIG. 1a), shown above a substrate (50) indicating that the length and width of the central portion (5) are in a proper relationship relative it its thickness so that it remains properly suspended (9) above the substrate.

Referring next to FIG. 2a, there is shown a side view of a mask similar to that in FIGS. 1a,b, except that the suspended central region (5) is narrower than that in FIGS. 1a,b, causing it to sag between its supports (20) and contact the substrate (50). Referring next to FIG. 2b, there is shown a cross-sectional view of a mask similar to that in FIG. 2a taken transversely through the narrow portion. In this mask, the central suspended portion (5) does not sag, but rather leaves to great a space between itself and the substrate (50). The deposition of a layer (30), such as a dielectric layer, a conducting lead layer or a magnetic biasing layer, produces undesirable regions of deposition (40), called overspray, beneath the suspended region. These undesirable regions effectively reduce the trackwidth region in an uncontrollable manner.

In order to retain the advantageous properties of a suspension bridge type mask as are set forth in detail in Han et al., yet to eliminate problems such as sagging or excessive space beneath the suspended portion as the mask is formed for use in increasingly narrow patterning processes, the present invention teaches a novel, modified, suspension bridge type lift-off mask in which the central suspended portion is rendered incompletely suspended by the formation of a thin ridge that runs between the distally located bridge supports formed from the underlayer, which ridge maintains the bridge at a fixed height relative to the substrate. The formation of such a ridge requires that the underlayer be very carefully etched so that the ridge offers mechanical stability and is reproducible, yet still eliminates the problems of fencing and mask collapse.

Prior art methods of dissolving the lower PMGI layer (eg. use of organic solvents or anisotropic plasma etches) to form the suspended bridge are either insufficiently controllable or damaging to the upper layer to be used to form the thin ridge structure. Therefore, the present method introduces a novel ozone oxidation method which effectively retards the dissolution rate of the PMGI in an organic solvent, rendering the rate and degree of undercut controllable with a high degree of precision. The use of ozone in an etching ambient is known in the prior art, where it has been applied to the etching of certain layers having an alloyed or elemental metal composition. Morgan et al. (US Patent Application Publication No.: US 2003/0170961 A1) teaches the etching of a portion (millimeters in dimension) of a layer formed of metals such as platinum, ruthenium, rhodium, palladium, iridium and their mixtures in an ambient comprising a halogenide, ozone and $H_2O$. The method taught therein, however, does not contemplate the controlled etching of a PMGI layer to form an etch mask which is dimensionally less than a micron in width.

SUMMARY OF THE INVENTION

A first object of this invention is to provide a lithographic method for patterning a giant magnetoresistive (GMR) read element in any of various configurations including current-in-plane (CIP), current-perpendicular-to-plane (CPP) and tunneling magnetoresistive (TMR), so that it has a trackwidth that is less than approximately 0.1 microns.

A second object of this invention is to provide such a method for forming dielectric layers, conductive lead layers and magnetic bias layers laterally disposed to the trackwidth region, wherein the lead and bias layers so formed do not exhibit excessive and unwanted material buildup (overspray) which can lead to poor definition of the trackwidth region, or fencing, which can lead to poor lift-off of the mask.

A third object of this invention is to provide a method for patterning a GMR read element trackwidth and depositing dielectric layers, conductive lead layers or magnetic bias layers thereon, using a big-layer lift-off mask having a central, substantially suspended upper layer which is maintained at a fixed height over a substrate by a ridge running longitudinally beneath the said suspended upper layer, wherein said ridge is an extension of and runs continuously between two distal lower pedestal regions formed of a lower layer.

In accord with the objects of this invention there is provided a big-layer (upper and lower layer) lift-off mask, the upper layer of the mask (the stencil or image-forming layer) having, in an overhead perspective, a "dog-bone" shape, in which a narrow central region is continuously connected to two flared distal regions. The mask is schematically illustrated in FIG. 3a and will be discussed more fully below in the context of the description of the preferred embodiments. The upper layer of the big-layer structure is formed of a photoresist material (or a material which can be exposed by appropriate radiation and developed) and the lower layer is formed of a PMGI polymer. The lower layer, which has substantially the same dog-bone shape as the upper layer and is symmetrically placed beneath the upper layer, cannot be seen from overhead, because it is uniformly undercut by being differentially etched relative to the upper region. The lower layer thereby attains a final shape as two distally disposed flared supports connected by a thin ridge running longitudinally between said supports. The thin ridge is substantially beneath the narrow central portion of the upper layer and maintains that portion at a fixed distance from a substrate on which the mask is formed. The flared supports serve as pedestals beneath the flared distal regions of the upper layer. The differential etching of the lower layer is accomplished by a novel method combining the use of selected organic photoresistive materials for the mask layers, an initial dissolution of the lower mask layer by an organic solvent, such as a 1.79% solution of TMAH (tetramethyl ammonium hydroxide), followed by a precisely controlled ozone oxidation process (without the TMAH) at an elevated processing temperature to create the final shape. It is noted that the use of TMAH alone produces an etch rate that is too high for the controlled thinning necessary to produce the ridge. On the other hand, anisotropic plasma etches, such as oxygen plasma etches, damage the upper layer of the mask. Thus, the combination of the initial use of TMAH alone, and the subsequent ozone oxidation produces the required control of the etch process that allows the objects of the invention to be achieved.

Referring to FIG. 4, there is shown an experimentally determined graph of the rate at which the underlayer is thinned vs. the processing time allotted to a TMAH dissolution and, in comparison, an ozone-assisted dissolution. It is seen from the steep slope of the TMAH curve that good control of the thinning is nearly impossible to obtain, while the smaller slope of the ozone-assisted dissolution (at three decreasing process temperatures, $T_1$, $T_2$ and $T_3$) allows the controlled thinning required by the invention. It is found experimentally that the dissolution rate of PMGI in a 1.79% solution of TMAH is about 10 nm/sec. Thus, a PMGI layer beneath an upper photoresist layer of thickness less than 100 nm. will be completely dissolved in less than 5 seconds. In the ozone-assisted process (no TMAH), the thickness reduction in the PMGI layer proceeded at lower rates between 0.2 and 0.3 nm./sec.

Once the etch is completed, the central, narrow portion of the upper layer's dog-bone shape is then used both as an etching stencil to pattern the substrate (which is typically a layered GMR configuration) in accord with the upper layer's image, and as a deposition mask to allow a deposition of laterally disposed dielectric layers (or conducting, or magnetic layers).

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figure, wherein:

FIGS. 1a and b are schematic overhead and transverse cross-sectional representations of a suspension-bridge type big-layer lift-off mask of the prior art.

FIGS. 2a and b are schematic side view and transverse cross-sectional views of a suspension-bridge type big-layer lift-off mask of the prior art showing sagging and overspray.

FIGS. 3a and b are schematic overhead and transverse cross-sectional views of the present invention.

DESCRIPTION OF THE PREFERRED EMBODIMENTS

Figure 4:
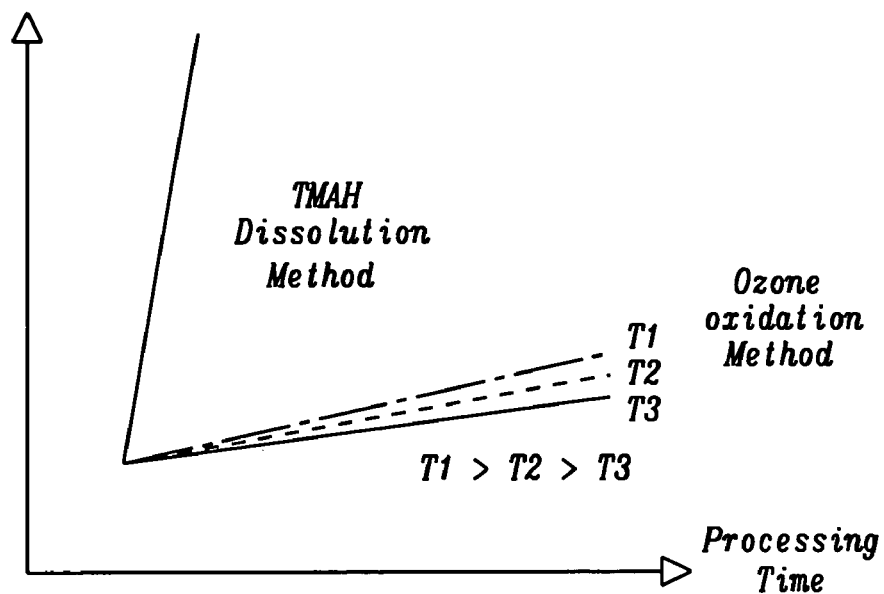
FIG. 4 shows a graphical indication of the etch control provided by the use of ozone-assisted oxidation compared to TMAH dissolution alone.

The present invention provides a big-layer lift-off mask having, in an overhead view, a dog-bone shape and formed of different upper and lower material layers. Although both the upper and lower layers have similar shapes, the lower layer is substantially undercut relative to the upper layer.

The upper layer of the mask has a narrow central portion that flares out to form broader distal portions. The central portion is held at a fixed height above a substrate by a ridge that connects two distally disposed pedestal regions formed from the lower layer. The ridge and pedestal regions are formed entirely of a single piece of the lower material layer by differentially etching the lower material layer relative to the upper material layer in a carefully controlled manner to be fully described below.

Referring to FIG. 3a, there is seen in a schematic overhead view the dog-bone shape of the upper (image) layer (60) and, in dashed lines (70) the similar shape of the lower (support) layer. It is understood that this figure illustrates the finished mask, subsequent to the patterning of the upper and lower layers. The narrow central upper portion of the mask, of width $W_1$ and length $L_1$, is shown circled (80) and the thin ridge (90) formed entirely from the lower layer is shown in dashed outline beneath the central portion. The distal flared regions of the upper layer (110) and corresponding supporting flared pedestal regions of the lower layer (100) are also shown. A line drawn transversely across the circled region (80) defines a transverse cross-sectional cut illustrated in FIG. 3b, also showing the substrate (50) and the central region (5) suspended above the substrate by the lower ridge (90). The materials appropriate for forming the upper layer include both positive and negative tone deep-ultraviolet (DUV) resists, E-beam resists and X-ray resists. The lower layer material includes PMGI and its derivatives. In a typical mask formation, the thickness of the upper, photoresist, layer is between approximately 0.1 to 2.0 microns. The thickness of the underlayer is in the range between approximately 0.03 to 0.1 microns. The width, $W_1$, is in the range between approximately 0.04 and 0.3 microns and the length of the bridge, $L_1$, is between approximately 0.5 and 2.0 microns. Although three specific examples will be given below, general parameters for ozone processing include a temperature range between approximately 50° and 150° C., an ozone concentration in the range between approximately 50 and 500 grams per cubic meter, and an ozone flow rate between approximately 5 and 50 liters per minute.

Referring again to FIG. 3b, there is shown the mask of FIG. 3a in cross-sectional schematic view. The cross-section of the central portion of the upper layer (5) is shown supported by the ridge of the lower layer (90), which contacts the substrate (50). The presence of the ridge prevents sagging of the central portion (5) and also prevents overspray of subsequent layer depositions (see FIG. 2b).

The following three examples will illustrate preferred materials, process parameters, dimensions and methods for forming a big-layer lift-off mask meeting the objectives of the present invention.

EXAMPLE 1

Figure 5:
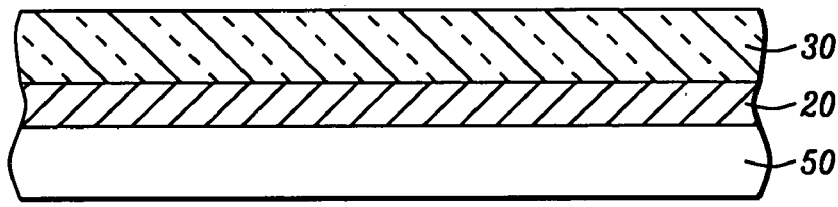
FIG. 5 shows a substrate overlaid with a layer of PMGI and a layer of photoresist being exposed to radiation.

1. Referring to FIG. 5, there is shown a substrate (50), which would typically be a GMR layered configuration of the CIP, CPP or TMR type, but which could be any layer require an ultra-thin patterning, which is to be patterned by a mask directly upon it. On the substrate is formed a layer (20) of PMGI approximately 50 nm. thick. A layer of DUV sensitive photoresist (30), commercially available NEB22A2 in this example, but not limited to this particular material, approximately 200 nm. thick is formed on the PMGI. The dual layer is patterned by KrF DUV photolithography (incident radiation being shown as arrows). It is understood that DUV radiation may be supplied by a variety of radiation sources including coherent radiation sources such as KrF and ArF lasers. Alternatively, with a proper choice of photoresistive material, E-beam and X-ray sources may also be used for exposure.

Figure 6A:
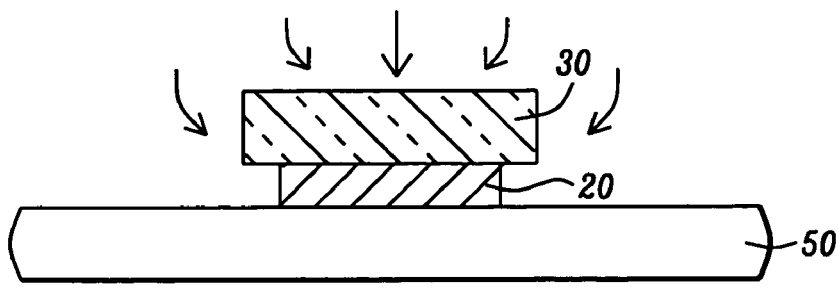
FIGS. 6a and b show overhead and transverse cross-sectional views of an initial patterning of the big-layer mask.
Figure 6B:
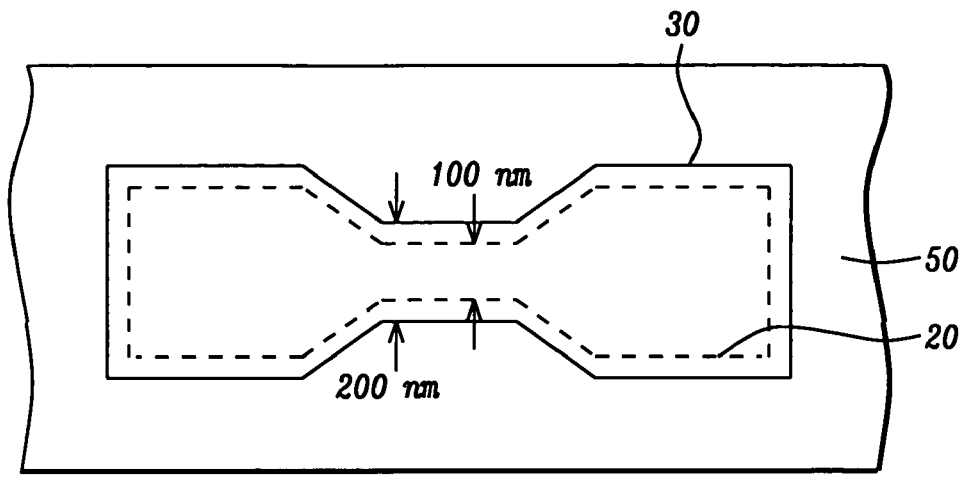

Referring to FIG. 6b, there is shown, schematically, the exposed formation in an overhead view while FIG. 6a shows, schematically, a transverse cross-sectional view of the formation through the narrow central portion. Unexposed portions of the layers have been removed by TMAH development leaving the upper photoresist portion (30) and the lower, undercut, PMGI layer beneath it (20), shown in dashed outline. The formation has been post-baked and developed in a solution of 1.79% TMAH, but concentrations up to 2.38% may be used. The exposed narrow central portion of the photoresist layer (30) is thereby reduced to an initial width of approximately 200 nm. and the corresponding central portion of the PMGI (20) is reduced in width to approximately 100 nm.

Figure 7A:
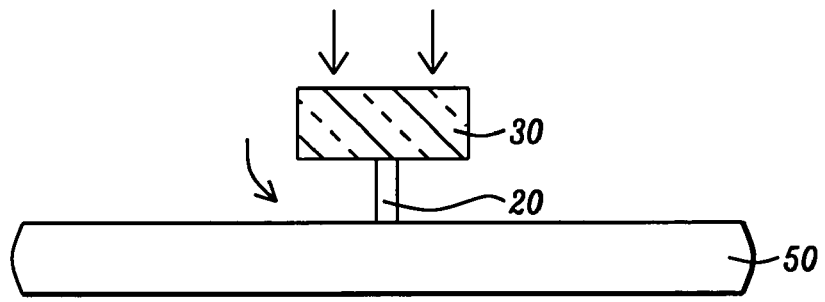
FIGS. 7a and b show final overhead and transverse cross-sectional views of the mask of FIGS. 6a and b.

2. Referring next to FIGS. 7a and b, there is shown, schematically, the final shape of the patterned dual resist/PMGI big-layer of FIGS. 6a and b subsequent to having been placed in an ozone processing chamber at 80° C. for approximately 5.5 min (but process times between 1 and 30 minutes may be required). The ozone concentration is maintained at 100 grams/m³ at a flow rate of 10 liters/min. Arrows (70) schematically indicate the ozone flow. The TMAH developing solution is not present during this final controlled undercut so that the ozone, acting alone, can reduce the dimensions of the upper and lower layers to the required narrow widths in a controlled manner.

3. Referring again to FIGS. 7a and b, there is shown in an overhead view the final width of the upper photoresist layer (30), which is reduced to 100 nm., while the final width of the PMGI layer beneath (20) it is reduced to 32 nm.

Figure 7B:
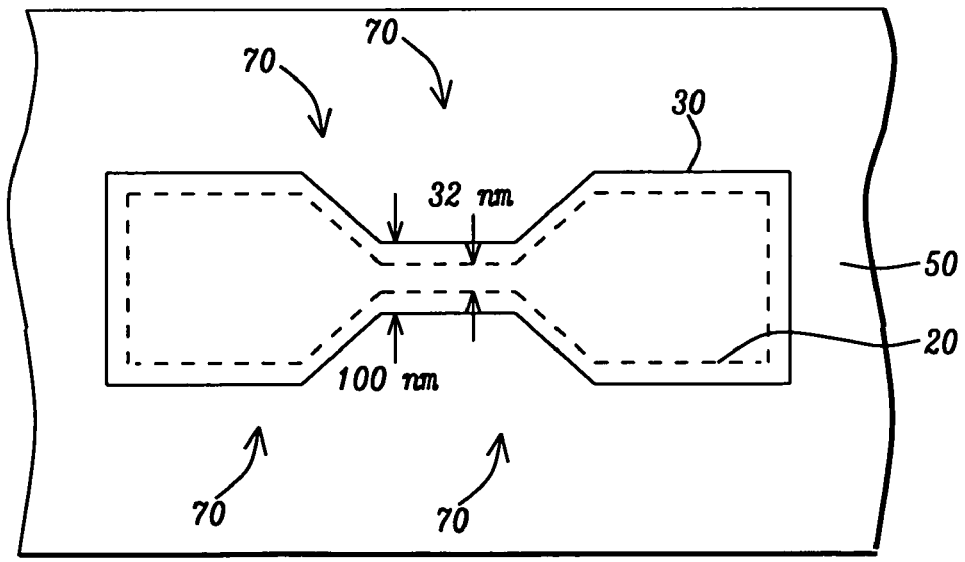

The following two examples can be read instructively with reference to the same FIGS. 5-7. Although the examples are described more briefly than the example above, the rationale for all process steps remains the same.

EXAMPLE 2

1. A layer of PMGI approximately 500 angstroms thick is deposited on a substrate. A layer of photoresist, NEB22A2, approximately 2000 angstroms thick is formed on the PMGI. The dual layer is patterned by KrF photolithography, then developed in 1.79% TMAH so that the photoresist layer is reduced to an initial width of approximately 200 nm. and the corresponding PMGI width is approximately 120 nm.

2. The patterned dual resist/PMGI big-layer is then placed in an ozone chamber at 80° C. for approximately 7.5 min. The ozone concentration is maintained at 100 grams/m³ at a flow rate of 10 liters/min.

3. The final width of the upper photoresist layer is reduced to 65 nm., while the final width of the PMGI layer beneath it is reduced to 17 nm.

EXAMPLE 3

1. A layer of PMGI approximately 500 angstroms thick is deposited on a substrate. A layer of photoresist, NEB22A2, approximately 2000 angstroms thick is formed on the PMGI. The dual layer is patterned by KrF photolithography, then developed in 1.79% TMAH so that the photoresist layer is reduced to an initial width of approximately 293 nm. and the corresponding PMGI width is approximately 60 nm.

2. The patterned dual resist/PMGI big-layer is placed in an ozone chamber at 80° C. for approximately 1, 4 and 8 min. The ozone concentration is maintained at 100 grams/m$^3$ at a flow rate of 10 liters/min.

3. The final width of the PMGI layer beneath it is reduced to 40, 30 and 15 nm. respectively.

As is understood by a person skilled in the art, the preferred embodiment of the present invention is illustrative of the present invention rather than limiting of the present invention. Revisions and modifications may be made to methods, materials, structures and dimensions employed in fabricating a big-layer lift-off mask for patterning a GMR read head of CIP, CPP or TMR configuration having a trackwidth below 0.1 microns, while still providing a method for fabricating a a big-layer lift-off mask for patterning a GMR read head of CIP, CPP or TMR configuration having a trackwidth below 0.1 microns in accord with the spirit and scope of the present invention as defined by the appended claims.

What is claimed is:

1. A plasma-free method for forming, on a substrate, a big-layer lift-off mask having an upper and a lower layer, both layers having a geometrically similar dog-bone shape, the upper layer being symmetrically formed on the lower layer, the lower layer being formed on said substrate and being uniformly undercut relative to said upper layer and wherein said dog-bone shape is characterized by a narrow central linear portion formed between flared distal portions, said central portion of the lower layer being substantially narrower than the central portion of said upper layer and thereby forming a narrow ridge that supports and maintains the central portion of said upper layer at a fixed height above said substrate and eliminates the accumulation of unwanted deposition residues, comprising:

providing a substrate;

forming on said substrate a lower layer of PMGI or its derivatives;

forming on said PMGI layer an upper layer of radiation-sensitive resist material;

exposing a dog-bone shaped region of said radiation-sensitive material with appropriate radiation, the central portion of said region having an initial width and a length;

developing said exposed upper layer, said developing process including the application of a solvent that removes all unexposed portions of said exposed upper layer as well as at least all portions of said lower PMGI layer not directly beneath said exposed layer and said solvent producing, thereby, an initial undercut of said PMGI layer relative to said upper layer; then performing, in the absence of said solvent and without the application of a plasma, an ozone-assisted additional undercut process of said lower PMGI layer by placing said layers in an ozone chamber, in the presence of an ozone oxidizing ambient wherein there is an ozone density, an ozone flow rate, an ozone processing time and a processing temperature, said process, thereby, producing a further undercut by a controlled rate of dissolution of the PMGI layer; and, using only the application of said ozone, producing a well controlled and void free undercut of the PMGI relative to the exposed upper layer while also continuing the dimensional reduction of said upper layer, the final width, $W_2$, of the central portion of the PMGI subsequent to said undercut being less than the final width, $W_1$, of the upper layer and said PMGI central region forming, thereby, a void free supporting ridge beneath said central portion of the upper layer and eliminating from beneath said central portion voids within which unwanted deposition residue can form.

2. The method of claim 1 wherein said radiation sensitive material is sensitive to exposure by E-beam, X-ray or deep ultraviolet radiation.

3. The method of claim 2 wherein said radiation is deep ultraviolet radiation (DUV) produced by a KrF laser or an ArF laser and said radiation sensitive material is DUV sensitive photoresist.

4. The method of claim 1 wherein the developing process includes a post-bake of the exposed upper layer and the application of a developing solution having a concentration of up to 2.38% of TMAH.

5. The method of claim 1 wherein the ozone-assisted undercut is produced in the absence of a solvent ozone ambient at a density between approximately 50 and 500 grams/m$^3$, wherein the application of ozone is at an ozone flow rate between approximately 5 and 50 liters per minute.

6. The method of claim 1 wherein said process time is between approximately 1 and 3 minutes.

7. The method of claim 1 wherein said process temperature is between approximately 50° and 150° C.

8. The method of claim 1 wherein the length of said central region is between approximately 0.5 and 2.0 microns.

9. The method of claim 1 wherein the final width, $W_1$, of said central region is between approximately 0.04 and 0.3 microns.

10. The method of claim 1 wherein the thickness of said upper layer is between approximately 0.1 and 2.0 microns.

11. The method of claim 1 wherein the thickness of said PMGI layer is between approximately 0.03 and 0.1 microns.

12. The method of claim 1 wherein said substrate is a GMR stack in a CPP, CIP or TMR configuration and wherein said big-layer lift-off mask is used to pattern said stack forming, thereby, a GMR read sensor having a narrow trackwidth of substantially the width, $W_1$, of said mask.

13. The method of claim 12 further including the use of said big-layer lift-off mask as a deposition mask to form additional material layers laterally disposed against said GMR read sensor, said additional layers being formed without overspray or fencing and said mask being lifted off said substrate without damage to said GMR sensor.

* * * * *